United States Patent [19]
Abileah

[11] Patent Number: 5,262,880
[45] Date of Patent: Nov. 16, 1993

[54] NIGHT VISION GOGGLE COMPATIBLE LIQUID CRYSTAL DISPLAY DEVICE

[75] Inventor: Adiel Abileah, Farmington Hills, Mich.

[73] Assignee: OIS Optical Imaging Systems, Inc., Troy, Mich.

[21] Appl. No.: 925,193

[22] Filed: Aug. 6, 1992

Related U.S. Application Data

[63] Continuation-in-part of Ser. No. 514,737, Apr. 26, 1990, Pat. No. 5,161,041.

[51] Int. Cl.$^5$ .......................................... G02F 1/1335
[52] U.S. Cl. ...................................... 359/040; 359/66; 359/68; 359/69
[58] Field of Search ................ 359/40, 66, 68, 69

[56] References Cited

U.S. PATENT DOCUMENTS

| | | | |
|---|---|---|---|
| 4,171,874 | 10/1979 | Bigelow et al. | 350/345 |
| 4,330,813 | 5/1982 | Deutsch | 359/40 |
| 4,456,336 | 6/1984 | Chung et al. | 350/338 |
| 4,616,295 | 10/1986 | Jewell et al. | 350/345 |
| 4,660,936 | 4/1987 | Nosker | 350/339 D |
| 4,704,004 | 11/1987 | Nosker | 350/345 |
| 4,749,261 | 7/1988 | McLaughlin | 359/51 |
| 4,768,096 | 8/1988 | Cannella et al. | 358/294 |
| 4,772,098 | 9/1988 | Ogawa | 359/40 |
| 4,798,448 | 1/1989 | Van Raalte | 350/345 |
| 4,824,210 | 4/1989 | Shimazaki | 359/41 |
| 4,915,479 | 4/1990 | Clark | 350/345 |
| 4,936,659 | 6/1990 | Anderson et al. | 350/339 D |
| 4,984,872 | 1/1991 | Vick | 350/345 |
| 5,103,327 | 4/1992 | Hirai et al. | 359/93 |
| 5,128,783 | 7/1992 | Abileah et al. | 359/40 |
| 5,150,232 | 9/1992 | Gunkima et al. | 359/51 |
| 5,161,041 | 11/1992 | Abileah et al. | 359/40 |
| 5,169,478 | 10/1992 | Akiyama et al. | 359/69 |

FOREIGN PATENT DOCUMENTS

| | | |
|---|---|---|
| 2471012 | 6/1981 | France . |
| 54-66862 | 5/1979 | Japan . |
| 63-110422 | 5/1988 | Japan . |
| 2198867 | 6/1988 | United Kingdom . |

OTHER PUBLICATIONS

"A Full Color AMLCD With NVG Class B Compatibility", IEEE AES Magazine (Mar., 1992), pp. 1237-1241, Abileah et al.
3M Scotch TM Optical Lighting Film Application Bulletin Thin Light Box, Preliminary Nov., 1988.
3M Scotch TM Optical Lighting Film General Theory, Preliminary Nov., 1988.
"Polarized Backlight For LCD" Technical (IBM) Disclosure Bulletin; vol. 33, No. 1B, Jun. 1990, pp. 143-144.
Military Standard MIL-L-85762A, "Lighting Aircraft, Interior, Night Vision Imaging System (NVIS) Compatible" (Aug., 1988), pp. 1-55.
Abileah et al, "Full Color Display With Amorphous Silicon Pin Diodes For High Performance Applications" Proc. SPIE vol. 1080, pp. 174-182 (Jan. 1989).
"Performance of Full Color Active-Matrix-LCD In The Cockpit Environment" Proc. SPIE, vol. 1117, pp. 131-141 (Mar. 1989), Abileah et al.
"8"×8" Full Color Cockpit Display", IEEE AES Magazine, pp. 3-6 (Mar. 1990) Robbins et al.

*Primary Examiner*—William L. Sikes
*Assistant Examiner*—Anita Pellman Gross
*Attorney, Agent, or Firm*—Myers, Liniak & Berenato

[57] ABSTRACT

A full color, night vision goggle compatible, liquid crystal display device achieves uniform illumination and color integrity at wide viewing angles by creating collimated, uniform light in a backlight assembly before the light reaches an IR filter having a sharp cutoff between near IR and red, and thereafter diffusing the light which is emitted from the filter to create the desired wide viewing angle.

13 Claims, 6 Drawing Sheets

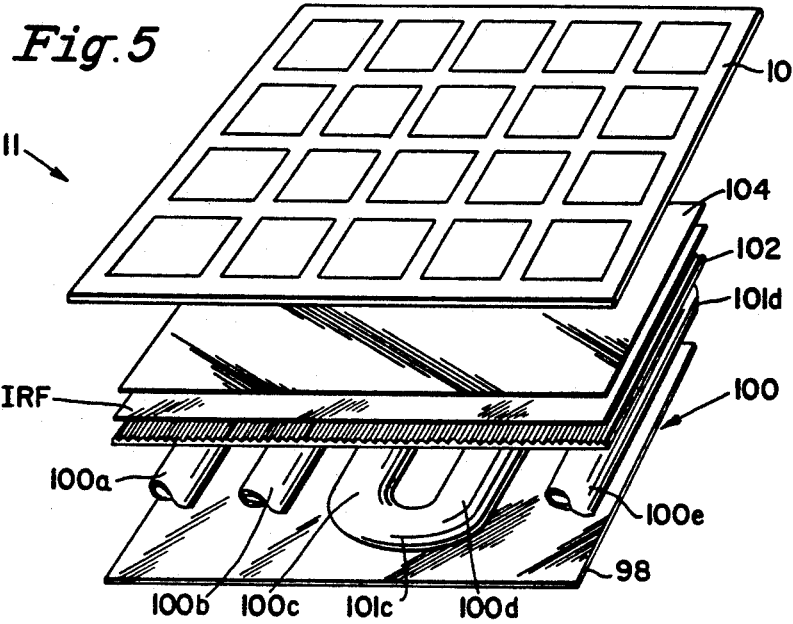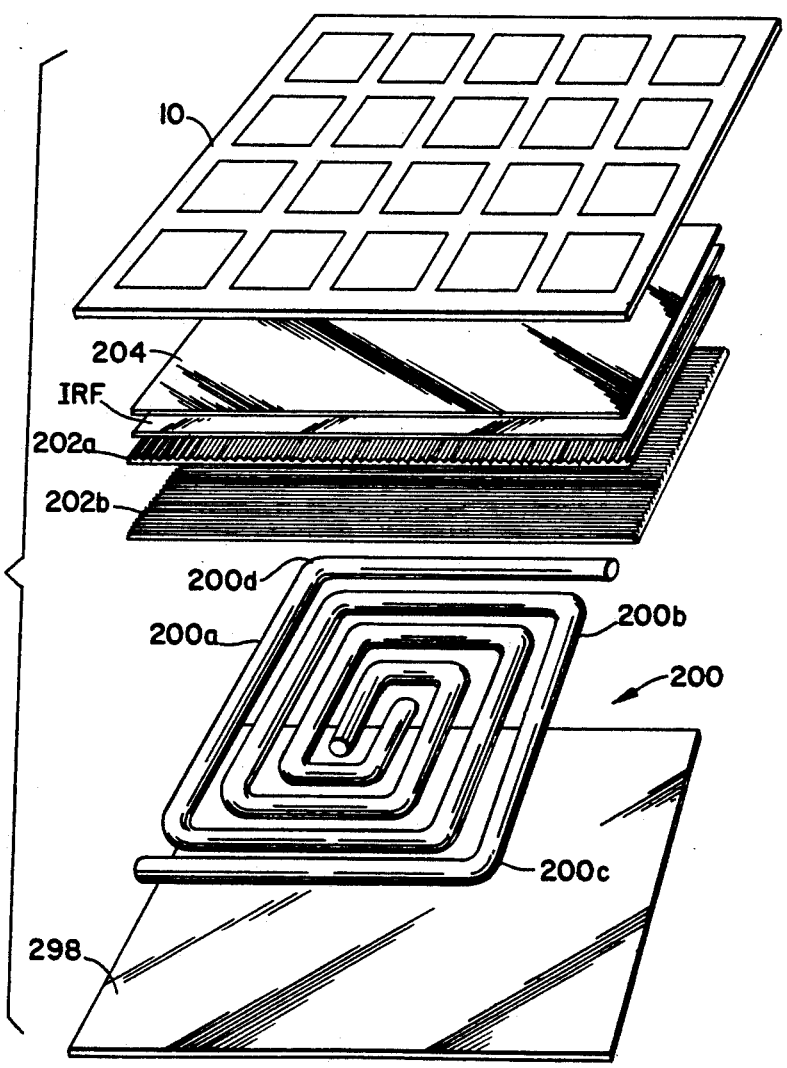

*Fig. 7*
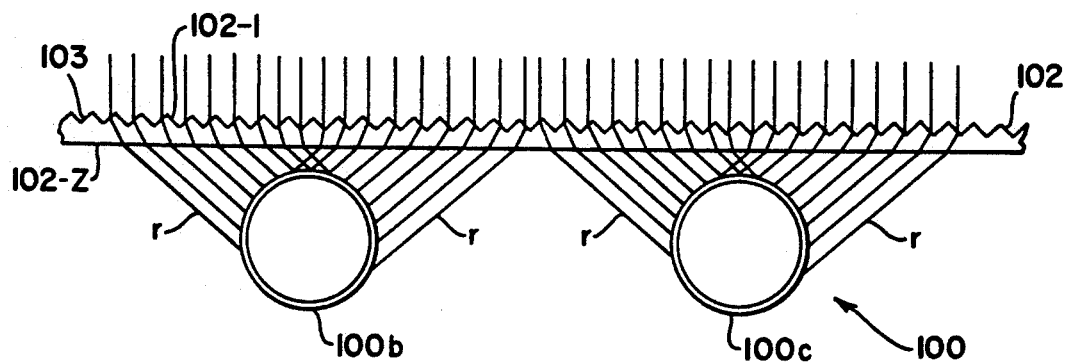
*Fig. 8*
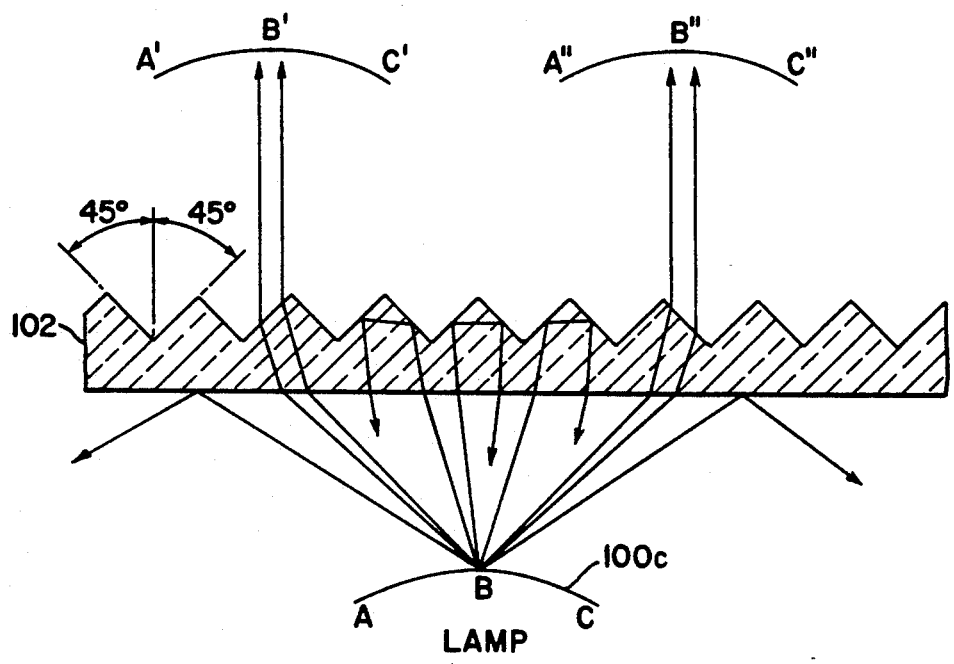

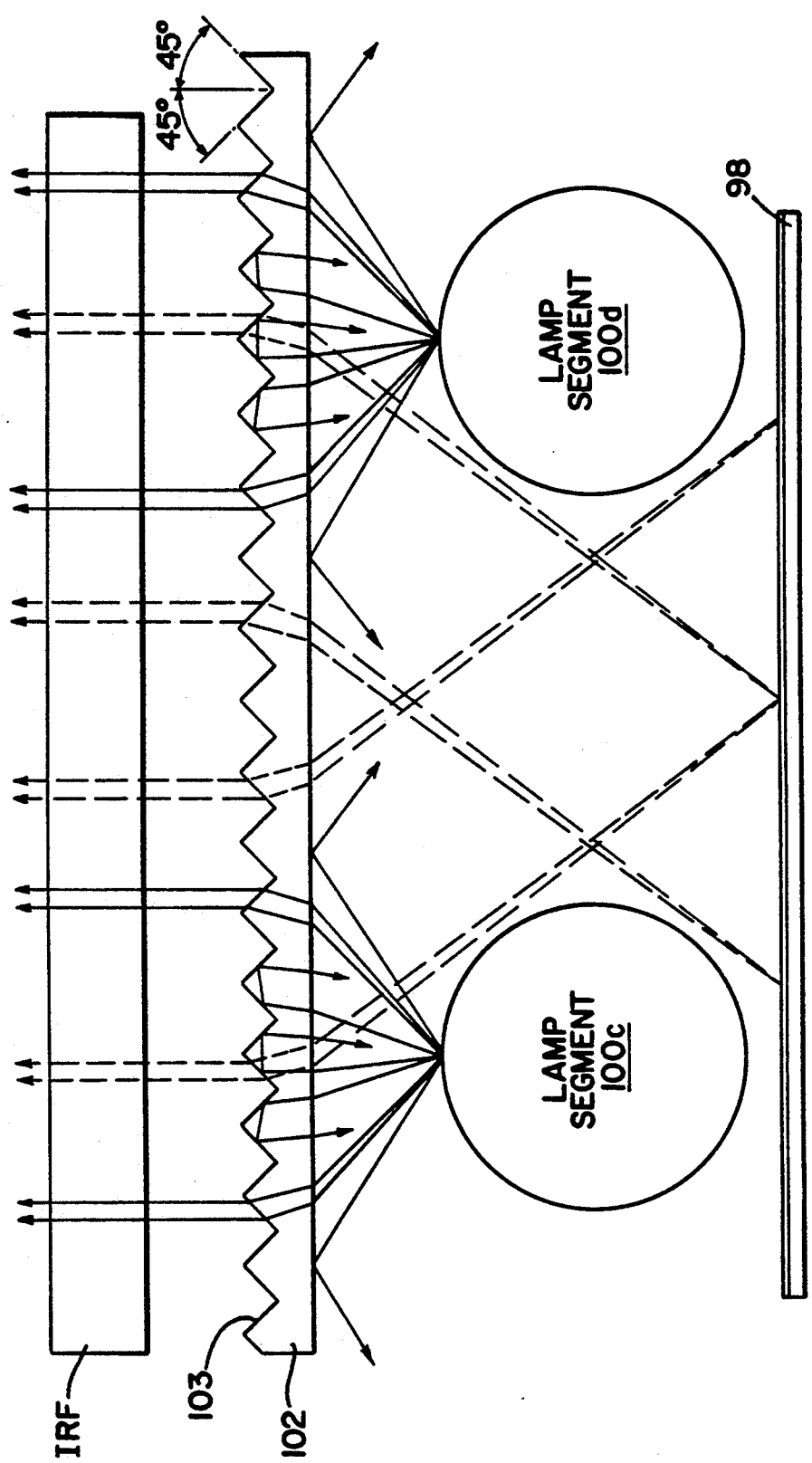

NIGHT VISION GOGGLE COMPATIBLE LIQUID CRYSTAL DISPLAY DEVICE

CROSS-REFERENCE

This application is a continuation-in-part of application Ser. No. 514,737 filed Apr. 26, 1990, and now U.S. Pat. No. 5,161,041 issued Nov. 3, 1992.

BACKGROUND OF THE INVENTION

This invention relates to liquid crystal display devices (LCDs) which are compatible with night vision goggles (NVGs). More particularly, this invention relates to backlit, liquid crystal display devices which filter out infrared light, thereby achieving compatibility with infrared-sensitive night vision goggles used in avionics and for military purposes.

The use of night vision goggles on flight decks and for many other military and avionics applications is rather widespread and increasing. Such goggles operate successfully because they are highly sensitive to very low levels of light, mainly in the near infrared (IR) region of the spectrum (i.e. about 630-1100 nm). The use of NVGs is not without its problems, however. For example, a major problem occurs in airplane cockpits when stray light from panel equipment and displays (e.g. an LCD) is reflected into the NVG, saturating it. Despite a significant effort undertaken in the prior art to block the IR region of the displays and panel equipment from emitting any IR light, particularly in the near IR region, this effort has not been rewarded with true success. This is because to be truly successful IR blockage must be accompanied by maintenance of color integrity (particularly of the color red) and the ability to view the LCD at reasonably wide angles from normal (e.g. up to about 60°). This is particularly true when it comes to achieving these results in the highly advantageous display devices known as backlit, liquid crystal displays (e.g. of the active matrix type, "AMLCD").

The problems associated with achieving acceptable IR blockage, while maintaining color integrity and wide viewing angles, are reported and demonstrated in Abileah et al., "A Full Color AML With NVG Class B Compatibility" IEEE, AES Magazine (March, 1992) pp. 1237 thru 1241. The entire disclosure of this report is incorporated herein by reference. It discloses not only some of the background from which this invention arose, but a preferred mode of this invention which solved the problem in the prior art as described above.

Generally speaking, the problem of achieving acceptable blockage of IR light, while maintaining color integrity and a reasonably wide viewing angle, is not simply achieved by using an IR-absorbing filter The major problem with the use of such a filter is that most known filters cut off some of the visible red light region as well (e.g. FIG. 2, Abileah et al., supra). This lack of a sharp cutoff between near IR and visible red results in an unbalanced white color, shifting the red color towards the orange. The resulting display thus can not pass the NVIS-B criteria of the MIL-L-857624 Standard.

The obvious solution, of course, would be to simply choose a filter with a sharp, near IR/red cutoff point. The problem is that known filters with such a sharp cutoff point only manifest this behavior (or characteristic) at an angle substantially normal to or at some preselected angle to the filter. As one views the LCD from angles more inclined from normal, the transmission curve once again exhibits the aforesaid problem of losing a sharp cutoff between near IR and visible red A tri-peak backlight, for example, will shift into the cyan region because the red transmission is cut from the white balance. True success, therefore, is not achieved by taking the obvious step of merely using a sharp cutoff filter.

In co-pending application Ser. No. 514,737, having an overlapping inventorship herewith, now U.S. Pat. No. 5,161,041, there is disclosed a unique LCD and backlighting system therefore The entire disclosure of this application/patent is incorporated herein by reference. Generally speaking, this unique LCD improved upon prior art backlit LCDs by including in such a system an integral collimating and image splitting means for collimating light from the light source in the LCD and for refracting light rays emanating from this light source to provide two, similar images thereof. By locating the split images contiguous, one to each other, the area of illumination was not only effectively enlarged, but a bright, uniform light distribution across a low profile LCD also resulted. This also resulted in wide angle viewability as well, by providing a light diffuser between the integral collimator/image splitter and the matrix array. The precise diffuser chosen depends on the application of the LCD.

In preferred forms of that invention the integral collimating and image splitting means included a thin film having light-refracting, faceted prisms formed on one of its faces. An example of such a film is 3M SCOTCH TM Optical Lighting Film. In preferred forms, this thin 3M SCOTCH. film is used by laminating it to a clear transparent sheet of glass, ceramic or plastic, and thereafter used as a layer in a low profile LCD stack. As will be described more fully below, by employing the basic concepts of this aforesaid co-pending invention and coupling it with a sharp cutoff IR filter of the requisite type, the instant invention unexpectedly is able to provide a true solution to the problem of NVG compatibility.

SUMMARY OF THE INVENTION

Generally speaking, this invention fulfills the above-described needs in the art, solving, in this respect, its heretofore experienced problem, by providing in a backlit, liquid crystal display which includes a source of light; a matrix array of rows and columns of liquid crystal picture elements spacedly disposed from one side of the light source; and means for collimating light, the collimating means operatively disposed between the light source and the matrix array of rows and columns of liquid crystal picture elements the liquid crystal display being capable of providing a colored image, including the color red, to a remotely positioned observer, and wherein there is further provided means for creating uniform lighting of said display, the improvement comprising located between the collimating means and the matrix array of picture elements, an infrared light-absorbing filter capable of preventing substantially all infrared light from being emitted from said display while, at the same time, transmitting substantially all red light therethrough, thereby to maintain the color integrity of the image of the display.

In certain preferred embodiments of this invention the light collimating means and the means for creating uniform lighting comprises an integral collimating and image splitting means for collimating light from the light source and for refracting light rays emanating from the light source to provide two, similar images thereof, thereby enlarging the area effectively illuminated by the light source, whereby a colored, bright, uniform light distribution is provided in a low profile assembly. In certain particularly preferred embodiments the integral collimating and image splitting means is so located with respect to the source of light so that the split images are contiguous, one with the other. In still further embodiments, uniformity of the light is enhanced, and a wide viewing angle is achieved, by locating a diffuser between the IR filter and the matrix array.

The terms "substantially all infrared light" and "substantially all red light" are used herein, together, to mean that the filter employed is one which creates a reasonably sharp cutoff between the near IR and red spectrum. An example of a filter with an unacceptable cutoff is shown in FIG. 2, p. 1238 of the aforesaid article in IEEE, Abileah et al. The result, as shown in FIG. 1, curve (2) of that article, is an unbalanced white color, and a shift of the red color toward orange. An example of a filter with an acceptable, reasonably sharp cutoff is shown in FIG. 3, p. 1239 of that article. Such a filter, which only achieves a truly sharp cutoff at angles normal to its surface, may be obtained from WAMCO Corp. (California, U.S.A.) as a "Wamco Night Vision Filter", and has the following SPECTRAL TABLE:

| SPECTRAL TABLE: NV-FLC-1 (TST) ABSOLUTE TRANSMISSION | | | |
|---|---|---|---|
| T | (nm) | T | (nm) | T |
| 7.007E-01 | 580 | 8.187E-01 | 760 | 1.999E-06 |
| 6.877E-01 | 585 | 8.087E-01 | 765 | 3.998E-06 |
| 6.907E-01 | 590 | 7.867E-01 | 770 | 2.999E-06 |
| 6.218E-01 | 595 | 8.017E-01 | 775 | 8.997E-06 |
| 6.298E-01 | 600 | 8.337E-01 | 780 | 8.997E-06 |
| 7.487E-01 | 605 | 4.998E-01 | 785 | 2.099E-05 |
| 8.107E-01 | 610 | 1.379E-01 | 790 | 3.399E-05 |
| 8.397E-01 | 615 | 3.799E-02 | 795 | 6.997E-05 |
| 8.277E-01 | 620 | 1.299E-02 | 800 | 1.699E-04 |
| 7.947E-01 | 625 | 5.198E-03 | 805 | 5.498E-04 |
| 7.707E-01 | 630 | 2.399E-03 | 810 | 1.200E-03 |
| 8.167E-01 | 635 | 1.200E-03 | 815 | 6.198E-04 |
| 8.417E-01 | 640 | 7.097E-04 | 820 | 3.099E-04 |
| 8.267E-01 | 645 | 4.398E-04 | 825 | 2.399E-04 |
| 8.257E-01 | 650 | 2.899E-04 | 830 | 2.699E-04 |
| 8.127E-01 | 655 | 1.999E-04 | 835 | 3.299E-04 |
| 7.927E-01 | 660 | 1.399E-04 | 840 | 4.998E-04 |
| 8.117E-01 | 665 | 1.100E-04 | 845 | 6.398E-04 |
| 8.477E-01 | 670 | 7.897E-05 | 850 | 7.097E-04 |
| 8.677E-01 | 675 | 5.298E-05 | 855 | 6.298E-04 |
| 8.567E-01 | 680 | 3.599E-05 | 860 | 4.998E-04 |
| 7.877E-01 | 685 | 2.199E-05 | 865 | 3.599E-04 |
| 7.257E-01 | 690 | 1.499E-05 | 870 | 2.399E-04 |
| 7.267E-01 | 695 | 9.996E-06 | 875 | 1.999E-04 |
| 7.707E-01 | 700 | 5.998E-06 | 880 | 1.499E-04 |
| 7.997E-01 | 705 | 4.998E-06 | 885 | 1.100E-04 |
| 8.017E-01 | 710 | 2.999E-06 | 890 | 7.497E-05 |
| 7.937E-01 | 715 | 2.999E-06 | 895 | 7.197E-05 |
| 7.877E-01 | 720 | 1.999E-06 | 900 | 5.998E-05 |
| 7.977E-01 | 725 | 1.999E-06 | 905 | 6.597E-05 |
| 8.207E-01 | 730 | 1.999E-06 | 910 | 7.797E-05 |
| 8.437E-01 | 735 | 9.996E-07 | 915 | 9.696E-05 |
| 8.467E-01 | 740 | 9.996E-07 | 920 | 1.399E-04 |
| 8.307E-01 | 745 | 9.996E-07 | 925 | 1.599E-04 |
| 8.157E-01 | 750 | 1.999E-06 | 930 | 2.099E-04 |
| 8.137E-01 | 755 | 1.999E-06 | | |

In the preferred forms of this invention the LCD is made up of a low profile stack which in order, from back to front display includes a reflector plate, a lamp, an integral collimator and image splitter, an IR filter, a light diffuser and finally, the pixel display. By locating the integral collimator, image splitter at the proper distance from the lamp to create contiguous images and thus uniform but collimated light, the problem of the filter giving a truly sharp cutoff only at angles normal to its surface is thereby overcome, since the light being emitted is normalized through collimation anyway ... thus insuring a truly sharp cutoff by the filter. By thereafter providing a diffuser, viewable, as such, by an observer remote from the display at wide angles from normal (e.g. up to 30°, and preferably about 60 or more from normal) is achieved. The choice of a diffuser depends on the type of viewing desired. Directional diffusers (i.e. limited viewing angles) or Lambertian diffusers (i.e. wide viewing angles) may be used.

The term "low profile" is used herein in accordance with its well known meaning in the art. Generally speaking, this term refers to an LCD which, through its thinness, does not take up inordinate space, often a critical characteristic or requirement to be met in avionics and aerospace vehicles. The term "low profile" may be defined by the term "LCD thickness". "LCD thickness" is herein defined as the backlight thickness including the ballast and dimming circuitry. To be a "low profile" LCD, its LCD thickness should be less than about 2 inches, and preferably about 1 inch or less.

A typical example of a preferred "low profile" LCD encompassed by this invention is one with the following display parameters:

| | |
|---|---|
| Screen size | 5.0" dia. |
| LCD thickness | about 1" |
| Viewing area | 3" (V) × 4" (H) (77 × 102 mm) |
| Pixel No. | 648 (H) × 240 (V) |
| Color groups | 432 (H) × 120 (V) |
| Resolution | 108 (H) × 80 (V) Color groups/in. |
| Color pattern | RGB - triad |
| Active device | TFT |
| Polarizers | crossed (NW - normally white) |

In the above table, the LCD thickness includes about 4,000 fl of diffused illumination after the NVG filter and diffuser The quality of white balance maintained by such a system at all reasonable viewing angles (e.g. about 0-60 from normal to the screen) is good and is exemplified in FIG. 5 of the aforesaid article by Abileah et al. as cited above and as incorporated herein by reference.

Preferred embodiments of this invention exhibit improved red color coordinates as stated above. In practice, the NVG capability (i.e. compatibility) of these preferred LCDs as tested using the criteria of the MIL-L85762A Standard for color displays with 0.5 fl intensity generally exhibit, at all points of the display and at reasonable viewing angles (preferably about 0°-60° or more from normal), an NRb of less than or equal to about 2.2E-09, although slightly higher numbers at the normal angle at the center of the display (e.g. NRb=about 2.094E-09) may also occur. Near the edges the numbers may be somewhat smaller (e.g. NRb=about 8.120E-10). Exemplary of such numbers are, again, shown in the aforesaid Abileah et al. article, FIGS. 6A and 5B. MIL-L-85762A is incorporated herein by reference.

In summary of the above, the subject invention in certain particularly preferred embodiments provides a full color AMLCD (active matrix liquid crystal display) having NVIS-B NVG compatibility and improved red color coordinates. This unique and advantageous result is achieved by the inventive combination of a sharp cutoff IR interference filter together with a backlight optic design which gets rid of the angular behavior problem of the filter through the use of a special collimating mechanism such as is disclosed in the aforesaid co-pending application U.S. Pat. No. 5,161,041. Such full color AMLCDs find wide and varied usages throughout avionics and the military. In this respect, very good visible impressions are achieved when using, for example, GEN-III NVGs.

This invention will now be described with respect to certain embodiments thereof as illustrated in the following drawings, wherein:

IN THE DRAWINGS

FIG. 1) is plotted on the abscissa.

Figure 2A:
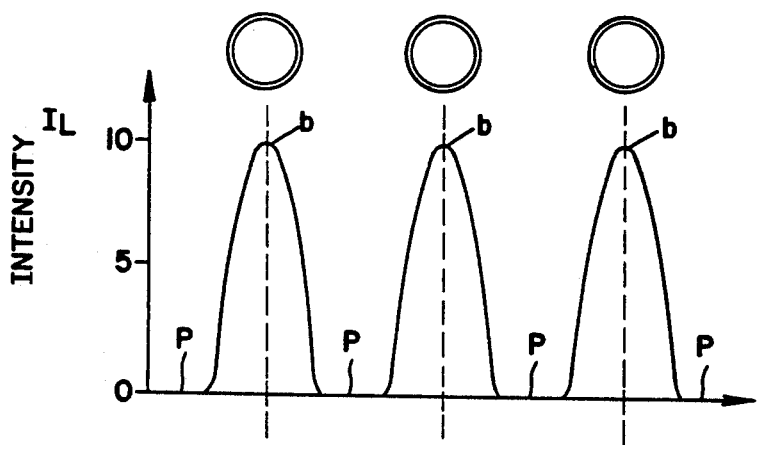
FIG. 2A is a graph of the lamp light intensity distribution in which the intensity of illumination is plotted on the ordinate and the horizontal position across the viewing surface of an electronic display (e.g.
Figure 2B:
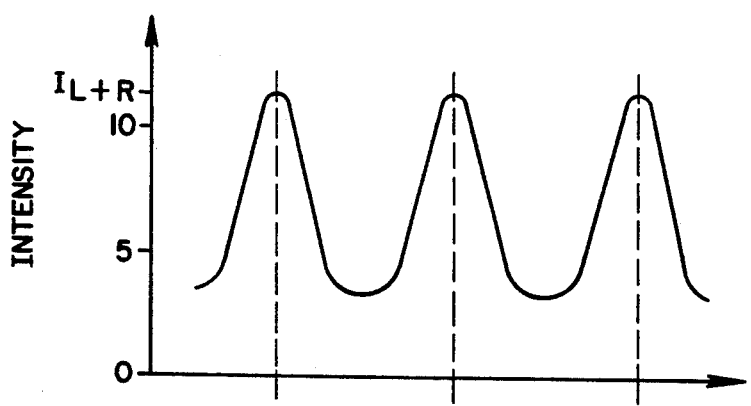
FIG. 2B is a graph of light intensity distribution in which the intensity of illumination is plotted on the ordinate and the horizontal position across the viewing surface of an electronic display of the type illustrated in FIG. 1, including a reflector, is plotted on the abscissa.
Figure 2C:
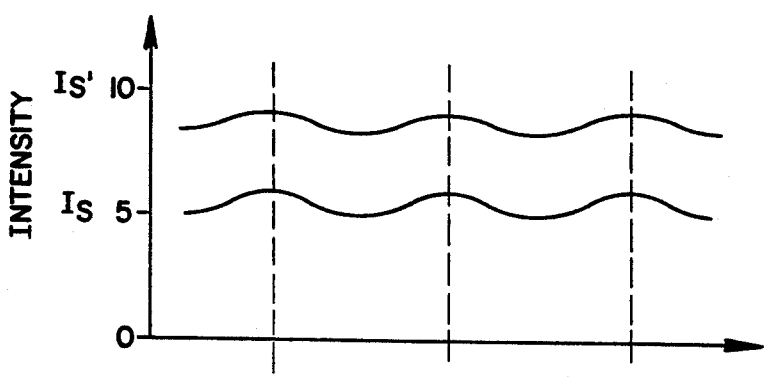

FIG. 2C is a graph of light intensity distribution in which the intensity of illumination is plotted on the ordinate and the horizontal position across the viewing surface of an electronic display is plotted on the abscissa, and illustrating the curve $I_s$ a typical, known backlighting arrangement and in curve $I_s'$ the improved backlighting arrangement of the aforesaid co-pending application, Ser. No. 514,737, now U.S. Pat. No. 5,161,041.

Figure 3:
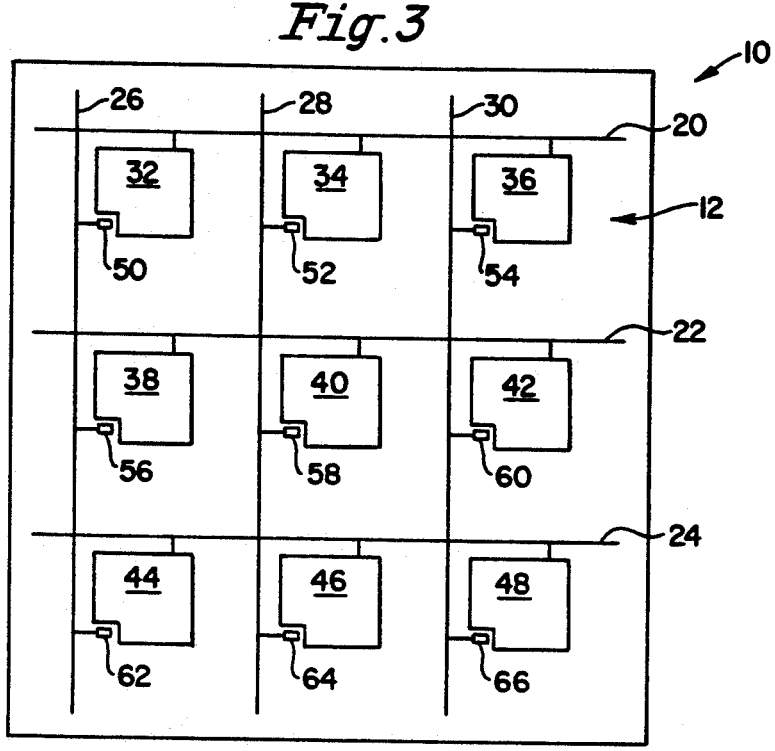

FIG. 3 is a stylistic front elevational view of the matrix array of rows and columns of liquid crystal picture elements of the active matrix embodiment of the electronic color display of the instant invention schematically illustrating the manner in which the threshold switching elements are operatively disposed between the address lines and one of the picture element electrodes.

Figure 4:
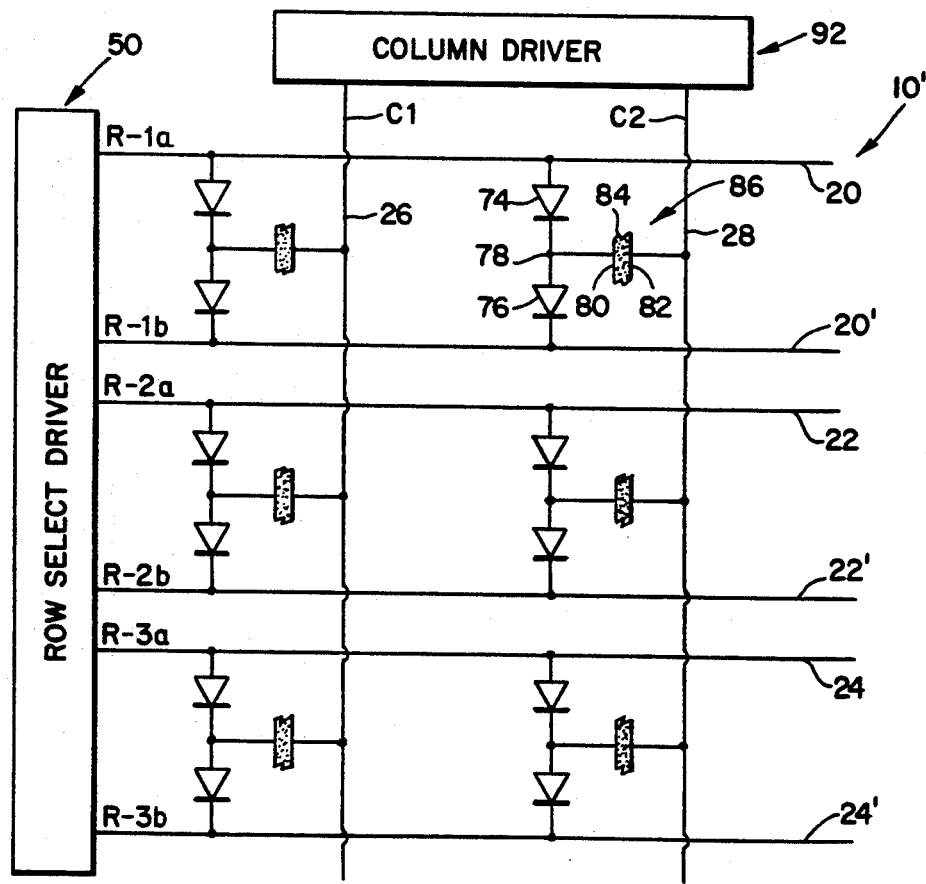

FIG. 4 is an equivalent circuit diagram of the active matrix embodiment of the array of FIG. 3, illustrating the relationship between the liquid crystal picture elements and the anode-to-cathode connected diode by which individual ones of the picture elements schematically depicted in FIG. 3 are addressed.

Figure 1:
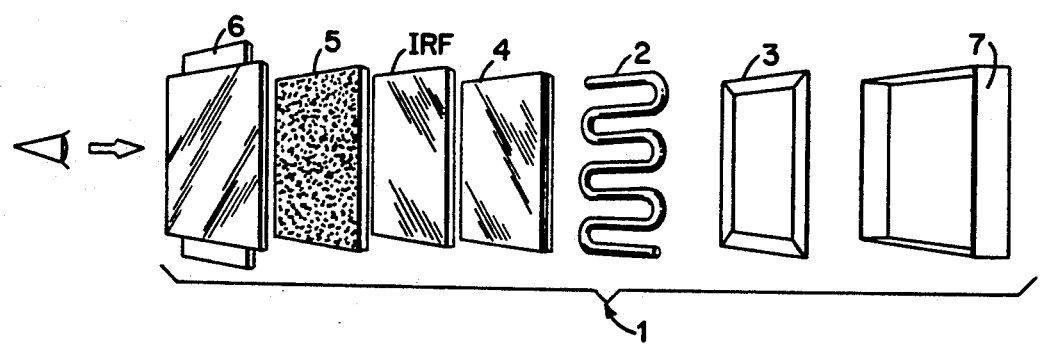
FIG. 1 is an exploded, perspective view illustrating a typical embodiment of the subject invention such as might be used in military and avionic applications.

FIG. 5 is a fragmentary perspective view illustrating the relative disposition of one embodiment of an LCD stack according to the instant invention which employs an axially aligned array of tubular lamps as shown in FIG. 1.

FIG. 6 is a fragmentary perspective view illustrating the relative disposition of another embodiment of the instant invention which employs a square helical array of tubular lamps and two image splitting/collimating lenses.

FIGS. 7, 8 and 9 are cross-sectional views of FIG. 5, illustrating the manner in which rays of light emanating from the axially aligned lighting configuration of FIG. 5 are split and collimated by the optical media of the image splitting/collimating lens array and, thereafter, in FIG. 9 are transmitted (or absorbed) by the IR filter as employed in the instant invention.

DETAILED DESCRIPTION OF THE INVENTION

Figure 1A:
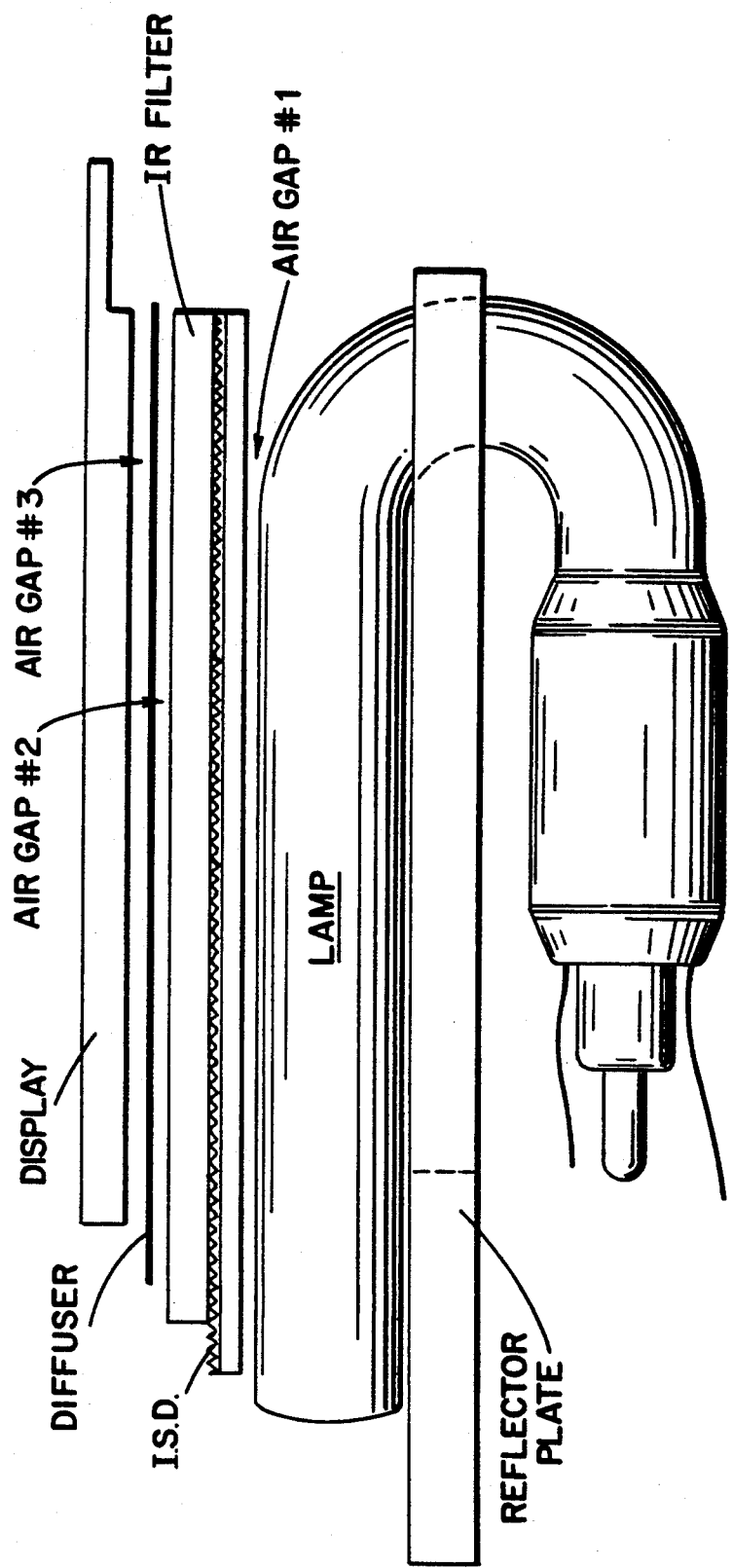
FIG. 1A is a side, schematic view of the embodiment of FIG. 1.

With reference now to FIGS. 1 and 1A, it can be seen how this invention inserts a sharp cutoff IR filter (IRF) into the unique structure of the aforesaid, co-pending application Ser. No. 514,737/U.S. Pat. No. 5,161,041.

Except for this difference, the subject embodiment is substantially the same as that disclosed by this prior invention, except, of course, that it is understood herein that this invention finds its true efficacy when the pixel array etc. is adopted for color imaging which employs the color red, and is not an LCD for which an IR cutoff filter is not necessary to employ in this respect, however, it is understood that active matrix liquid crystal displays, which operate in full color and in the transmissive mode, represent the primary choice of flat panel technologies for avionic and military applications because of their sunlight readability, high resolution, color and gray scale capability, low power consumption and thin profile. It is to be specifically noted that while an active matrix liquid crystal display will be described in detail hereinafter as a preferred embodiment, the instant invention can be used with equal advantage in any type of backlit electronic display known to routineers in the art in which infrared light emissions are prohibited or are to be significantly diminished.

Generally speaking, in order to electronic displays to gain increased acceptance in military and avionic applications, the backlighting of flat panel displays, and particularly active matrix liquid crystal displays, must be improved in light efficiency and reliability. In order for a full color liquid crystal display to possess acceptable contrast under high ambient lighting conditions, the backlighting arrangement must be bright. While current backlighting systems have the requisite light output, they still require high power (on the order of 2.4 watts/square inch) and a depth dimension of about two inches. In contrast thereto, the backlight assembly of the instant invention, like those of the aforesaid co-pending application/U.S. Pat. No. 5,161,041, consumes only about 1.2 watts/square inch of power with a depth dimension of only about one inch. In addition, this design increases lamp life, a critical parameter in the design and successful marketing of electronic displays, to approximately 8,000 hours or more from the typical values of about 4,000 hours exhibited by prior art lighting arrangements known prior to the invention of the aforesaid co-pending application/patent.

Liquid crystal displays operate as light modulators and do not emit light. Therefore, liquid crystal displays rely upon ambient illumination or backlighting to provide the light necessary for reading. Active matrix liquid crystal displays use a twisted nematic liquid crystal material and two polarizers as the optical components in the modulating mechanism. These materials, together with the color filters, result in a color display panel which can only transmit about 4%-5% of radiation incident thereupon. Therefore, a bright backlight is necessary in order for full color displays to be clearly readable in bright ambient environments.

Almost all backlighting assemblies designed for active matrix liquid crystal display applications have the same basic components. More specifically, each backlighting assembly usually includes a light source, an optical system comprising one or more lenses for altering the nature of the light emanating from said light source, a diffusing material to enable visibility from a wide range of viewing angles, and light source control electronics (ballast). An exploded perspective view of a fluorescent lamp-based backlight assembly typical in the prior art except for IRF, is illustrated in FIG. 1. (The use of the aforesaid special integral image splitting/collimating lens of the aforesaid co-pending application/patent instead of a conventional lens 4 will be described hereinafter.) The backlight assembly depicted therein is represented generally by the reference numeral 1 and as is typical in the industry, employs a tubular fluorescent lamp 2 as the light source. Of course, the lamp 2 may be arranged in any one of a plurality of well known configurations: it may be serpentined as shown in FIG. 1, alternatively the lamp may be "U-shaped", or straight.

Returning now to FIG. 1, the typical backlight system further includes a backreflector 3, a lens element 4, and a diffuser 5. Of course, disposed in front of the backlight assembly 1 is a display element comprising a plurality of rows and columns of liquid crystal picture elements adapted to be illuminated by said backlight assembly. The purpose of the backreflector 3 is to redirect light which is not initially directed towards the display element so that the maximum amount of light available from a given light source is directed towards the display 6.

Generally speaking, the optical element 4 is provided to alter or enhance the quality of the light emanating from the light source. While the optical element is an important, indeed necessary, component of the backlight system, it is often the primary cause of increased profile (i.e. increased thickness) in a liquid crystal display system. This is due to the fact that in order to achieve the desired optical effect, it was, prior to the invention in the aforesaid co-pending application/patent, often necessary to operatively space the plurality of lenses which make up the optical element a preselected distance from one another. For example, a collimating lens such as a Fresnel lens, is characterized by a focal length which defines the operative spacing from the light source necessary for the lens to effectively collimate the light. This spacing, along with the operative spacing required by, for example, a diffuser, significantly increases the profile of the backlight assembly.

It was to the end of reducing the profile of the liquid crystal display system that the invention of the aforesaid co-pending application/patent is directed. This was accomplished by incorporating two necessary optical components, an image splitting lens and a collimating lens into a single, integral image splitting/collimating lens. More particularly, that invention included an image splitting lens for effectively doubling the area which the light source can uniformly and effectively illuminate. The image splitting lens was, however, further adapted to collimate the light emanating from the lamp 2 for uniform distribution onto the back of the matrix forming the liquid crystal display 6. This light, before reaching the matrix, was diffused, however, to achieve a wide viewing angle. There are several ways to obtain light collimation, such as, for example, through the use of various combinations of parabolic-shaped reflectors and lens elements. However, the image splitting means of that invention, as well as that of the preferred forms of the instant invention was, and is here, adapted to collimate light passing therethrough due to the presence of multi-faceted prisms formed on the surface thereof. Specifically, engineered facets of close tolerances will not only achieve the desired optical effect of splitting the image of the light source, but will also collimate each image.

The instant inventors, as reported in the aforesaid co-pending application/patent, found that a material ideally suited for use as an image splitting/collimating lens is Optical Lighting Film (registered Trademark of 3M SCOTCH) which may be subsequently laminated onto a transparent substrate such as glass, other ceramic or a synthetic plastic resin, and used in the LCD. This invention adopts such an embodiment as preferred. By employing an integrally formed image splitting/collimating lens in this way, it is thus possible to achieve the desired optical effects without a decrease in the profile of the display as compared to other non-integrally formed optical systems. Indeed, since the distance between the two, similar images provided by the image splitting lens is controlled by the operative spacing of the lens from the light source (i.e. the more distant the lens from the light source, the farther apart said two images appear) and since it is desired that the distance between the two images be controlled so that said two images are immediately adjacent (i.e. contiguous) one another, it is possible, indeed desirable, to dispose the image splitting/collimating lens in close proximity to the light source 2.

Returning now to FIG. 1, a diffuser 5 of known and conventional design is provided to scatter the collimated light so that it will illuminate the display matrix 6 in all directions and provide acceptable off axis (wide angle) viewing (e.g. 0°-30° and preferably about 60° or more). However, due to the high degree of uniformity of light provided by the image splitting/collimating lens, it is not necessary to diffuse the light to the extent necessary in prior art backlight assemblies prior to the invention in the aforesaid co-pending application/patent, and thus the profile of the backlight assembly is further reduced. The backlight assembly 1 further includes in conventional fashion (not shown for convenience) lamp control electronics having provisions for lamp starting, a ballast 7 and dimming circuitry.

The light output of the light source 2 disposed behind prior art assemblies without an integral collimating/image splitting element used in place of lens 4, such as the liquid crystal display 6 of FIG. 1, would not be uniform and will be dependent upon the configuration of the lamps employed and the type of optical system, if any, employed. In addition, the sharp cutoff of filter IRF would only truly exist at a viewing angle normal to the surface of the display. The loss of color integrity would increase, in this respect, as one went to even modest viewing angles from normal. FIG. 2A illustrates the distribution of light intensity directly in front of the serpentine arrangement of fluorescent lamps 2 depicted in FIG. 1, as unenhanced by an optical system (i.e., without any collimating, image splitting or diffusing elements). As can be easily discerned from FIG. 2A, unenhanced light emanating from the light source will inevitably lead to areas of localized high intensity of illumination on the array of liquid crystal pixels. This, of course, results in local bright spots, such as b, and local pale spots, such as p, in the displayed image and therefore degraded image quality.

Of course, it is one of the purposes of an optical system, such as 4 in FIG. 1, to redistribute the intensity of radiation from the high intensity areas to the areas of lower intensity while maintaining the total integrated light output from the lamp assembly 2. FIG. 2B depicts the typical distribution of light intensity of the serpentine arrangement of fluorescent lamps 2 of FIG. 2A to which a backreflector 3 has been added. Acceptable uniformity across the viewing surface of the liquid crystal display requires optimization of the backreflector 3 in conjunction with the other optical components. Current backlighting arrangements have been configured to provide acceptable uniformity thereacross, but they lose about one-half of the energy emanating from the lamps. The curve marked as $I_s$ in FIG. 2C illustrates an intensity of illumination that can be expected from current backlighting designs having back reflector and spaced diffuser. In the detailed description of the aforesaid co-pending application/patent, a highly efficient optical system is disclosed that maximizes light output while achieving a high degree of uniformity across the viewing screen, in the manner shown by the curve $I_s'$.

The lamp and optical configurations are critical elements in the design of such systems because the characteristics thereof determine the final performance parameters and the overall structural profile of the display. In achieving an optical system characterized by such performance, fluorescent lamps should be capable of operation at a substantially reduced power level, thus to result in prolonged life. This also reduces heat build-up, thereby reducing thermal management requirements and permitting a more compact design. These improvements not only result in an improved backlighting arrangement in terms of uniformity and intensity, but one that is more reliable and less expensive to build and maintain.

Referring now to FIG. 3, there is depicted therein a typical matrix array of rows and columns of discrete liquid crystal display picture elements, said matrix array being generally designated by the reference numeral 10. Each liquid crystal display picture element, or pixel, 12 includes two spacedly disposed pixel electrode plates with a light influencing material, such as a liquid crystal composition, operatively captured therebetween. (The electrode plates and the light influencing material will be discussed in detail with respect to FIG. 5.) Each of the pixels 12 further includes a threshold switching device or a plurality of threshold switching devices for selectively applying an electric field across the liquid crystal composition when the electric field exceeds a predetermined threshold value.

More specifically, the matrix array 10 which defines the liquid crystal display of the instant invention includes a first set of X address lines 20, 22 and 24: a second set of Y address lines 26, 28 and 30; and a plurality liquid crystal picture elements 32, 34, 36, 38, 40, 42, 44, 46 and 48. The display further includes at least one isolation or addressing element 50, 52, 54, 56, 58, 60, 62, 64 and 66 operatively associated with and electrically connected to each respective one of the picture elements. As should be readily apparent to the reader from even a cursory review of FIG. 1, the X address lines 20, 22 and 24 and the Y address lines 26, 28 and 30 cross over one another at an angle so as to define a plurality of spaced crossover points associated with respective ones of the liquid crystal picture elements 32-48. The picture elements are formed on a transparent substrate, such as glass, and are distributed thereover in spacedly disposed relation so as to define interstitial spaces therebetween.

As can be ascertained from a perusal of FIGS. 3 and 4, each of the threshold devices 50-66 is preferably coupled in non-opposing series relation with a first one of the pixel electrodes. This type of switching arrangement will now be described in greater detail with respect to FIG. 4. In FIG. 4, the matrix array 10' includes a plurality of substantially parallel address line pairs 20, 20', 22, 22', 24 and 24' which are the row select lines and a plurality of substantially parallel column address lines 26 and 28. The column address lines 26, 28 and 30 cross the row select address line pairs at an angle and are spaced from the row select address line pairs to form a plurality of crossover points therewith. Preferably, the column address lines cross the row select line pairs at an angle which is substantially perpendicular thereto.

Since, as mentioned hereinabove, each of the pixels are identical, only pixel 12 will be described in detail in the following paragraphs. Pixel 12, as can be seen from the figures, includes a pair of threshold devices 74 and 76 which are electrically coupled together at common node 78. The threshold devices 74 and 76 are preferably diodes and are electrically coupled together in non-opposing series relationship between the row select address line pair 20 and 20'. Although the threshold devices, in accordance with the preferred embodiment of the invention are diodes, said devices can be of any type which provides a high impedance to current flow when reverse biased and a comparatively low impedance to current flow when forward biased. Therefore, any bidirectional threshold switch or field effect transistor (i.e. TFT, thin film transistor) can be utilized with equal advantage. Of course, more conventional electrical interconnections would be employed with field effect transistors. As shown in the previous example of the 5.0" diameter LCD, TFTs are in certain instances preferred.

The picture element or pixel 12 further includes a pair of electrode plates 80 and 82 which are spaced apart and facing one another. Operatively disposed in the space between the electrodes 80 and 82 is a light influencing material 84. The term "light influencing material" is defined and will be used herein to include any material which emits light or can be used to selectively vary the intensity, phase, or polarization of light either being reflected from or transmitted through the material. In accordance with the preferred embodiment of the invention, the light influencing material is a liquid crystal display material, such as a twisted (TN) nematic liquid crystal material. In any event, the electrodes 80 and 82 with the liquid crystal material 84 disposed therebetween form a storage element 86 (or capacitor) in which electric charge can be stored. As illustrated, the storage element 86 is coupled between the common node 78, formed by the electrically connected diodes 74 and 76, and the column address line 26.

Still referring to FIG. 4, the display 10 further includes a row select driver 90 having outputs R-1a, R-1b, R-2a, R-2b, R-3a, and R-3b electrically coupled to the row select line pairs 20, 20', 22, 22', 24 and 24' The row select driver 50 provides drive signals at the outputs thereof to apply first operating potentials which are substantially equal in magnitude and opposite in polarity between the row select address line pairs to forward bias the threshold devices to in turn facilitate the storage of electric charge in the storage elements coupled thereto. The row select driver also applies second operating potentials which are substantially equal in magnitude and opposite in polarity between the row select address line pairs to reverse bias the threshold devices to facilitate the retention of the electric charge stored in the storage elements coupled thereto.

Lastly, the electronic display 10 includes a column driver 92. The column driver 92 includes a plurality of outputs, C1 and C2, which are coupled to the column address lines 26 and 28, respectively. The column driver is adapted to apply a charging potential to selected ones of the column address lines for providing electric charge to be stored in selected storage elements during the application of the first operating potentials to the row select address line pairs by the row select driver 50.

It is preferred that the matrix array of rows and columns of picture elements that combine to make up the improved electronic display 10 of the instant invention utilize a "balanced drive" scheme for addressing each discrete one of the pixels thereof in this driving scheme, the operating potentials applied to the row select address line pairs are always substantially equal but opposite in polarity. Assuming that the current-voltage characteristics of each of the diodes are substantially equal, a voltage of substantially zero volts will be maintained at the common node 78, at least when the diodes are forward biased. Thus, the voltage applied on the column address line 26 to charge storage element 86 no longer needs to take into account the voltage drop across and/or parasitic charge build-up on one or both of the diodes 74 and 76. Therefore, each pixel in the matrix array of rows and columns may be charged to a known and repeatable value regardless of its position in that matrix array. This permits improved gray scale operation resulting in at least 15 levels of gray scale in large area active matrix displays of the twisted nematic liquid crystal type using normal fluorescent back illumination. The pixels can also be charged more rapidly since the retained charge in the diodes associated with each pixel when they are reverse biased need not be initially dissipated to charge the storage elements. This is because this charge is dissipated when the diodes are first forward biased. A complete description of this driving scheme can be found in U.S. Pat. No. 4,731,610 issued on Mar. 15, 1988 to Yair Baron et al. and entitled "Balanced Drive Electronic Matrix System And Method Of Operating The Same", the disclosure of which is incorporated herein by reference.

Schematically illustrated in FIG. 1 is a sharp cutoff infrared light filter IRF whose effectiveness is only truly realized at a viewing angle normal to its surface, unless, in accordance with the instant invention, lens 4 is replaced by a special lens system which overcomes this problem and at the same time, achieves uniformity of light. Thus, the aforesaid invention of co-pending application Ser. No. 514,737/U.S. Pat. No. 5,161,041 becomes an ideal environment for practicing the subject invention, because it has now been found that such an environment solves and overcomes the viewing problem associated with the use of special sharp cutoff IR filters. Therefore, while any lens system which creates uniformity and collimation thereof may generally be used in the practice of this invention, the system of the aforesaid co-pending application/patent is the most preferred.

In this respect, it is noted that collimating light is known. For example, in U.S. Pat. No. 5,128,783 a collimating backlight system for LCDs is disclosed which provides substantially uniform light. However, in this device the special lens is an integral diffusing/collimating lens. By diffusing as well as collimating before the light reaches the filter, it does not overcome the problem associated with sharp cutoff IR filters Turning now to FIG. 5, there is depicted in a fragmentary perspective view, one preferred embodiment of the instant invention. As can be seen, this embodiment adopts as its basic environment the configuration of FIG. 5 in the aforesaid co-pending application/patent. In this embodiment of the invention, the image splitting/collimating lens 102 and infrared filter IRF is operatively disposed so as to provide for a low profile electronic display assembly 11. Achieving a low profile or depth dimension of the display is important to the preferred embodiments of this invention. It is dependent on the type of lighting assembly, the material from which the threshold devices are fabricated, the on-board electronics, the multiplexing schemes, and most importantly, the optical arrangement by which light is collimated, diffused and transmitted to the viewing audience In most instances, as envisioned herein, the depth dimension or "LCD thickness" is maintained below about 2", and preferably at about 1".

There are six (6) basic elements which combine to form the electronic display 11 depicted in FIG. 5. The uppermost element is the generally rectangularly-shaped glass panel 10 upon which the rows and columns of active matrix liquid crystal picture elements as well as the associated drive circuitry, described in the preceding paragraphs, are disposed. The lowermost element is the thin, generally rectangularly-shaped back reflector panel 98 upon the interior surface of which one or more thin film layers of highly reflective material, such as aluminum or silver and a light transparent material having a low index of refraction, are deposited. A white reflector coating (Anal. Std.) made by Kodak Corp. #6080 Lab leader has been found satisfactory. A 3M Corp. white plastic reflective material may also be used. Disposed immediately above the highly reflective panel 98 is an array of light sources 100 (such as a continuous bent fluorescent tube) from which radiation emanates and either passes directly towards the matrix array of picture elements or is reflected off to the highly reflective panel and then passes upwardly toward said matrix array. Next, an image splitting/collimating lens 102 as described in the aforesaid co-pending application/patent is operatively located between the array of light sources 100 and the matrix array of picture elements 10. Thereafter, IR filter IRF is disposed, followed by diffuser 104. It is the combination of these elements which define the profile, preferably the low profile, of the electronic display of the instant invention. This profile is also schematically illustrated in FIG. 1A wherein in side view the three air gaps #1, 2 and 3 are better illustrated. Also illustrated here is how the 3M SCOTCH film image splitting device which collimates the light and splits the image is laminated to a clear glass, plastic or ceramic sheet.

More specifically, it is important to note that lighting is one of the critical parameters which is employed in assessing the visual appearance of a liquid crystal display. Not only is it essential that the image of the display appear clear and bright to the viewers thereof, but it is also important that the image be substantially as clear to viewers disposed at an angle relative to the vertical plane of the viewing screen of the display. The structural and optical relationship existing between the array of light sources and the image splitting/collimating lens 102 and the location and type of diffuser helps to determine the clarity and viewing angle of the display.

In the preferred embodiment of the invention illustrated in FIGS. 1A and 5, the array of light sources 100 is configured as one elongated, serpentined fluorescent lamp (although it must be appreciated that a plurality of discrete elongated tubular lamps could be employed without departing from the spirit or scope of the instant invention) arranged in a specific pattern or lighting configuration and having each section of lamp disposed in a generally horizontal plane. More specifically, the array, regardless of configuration, will be arranged to uniformly distribute radiation emanating therefrom over the entire surface area of the matrix of rows and columns of picture elements 105. To this end, the lighting array is shaped in a serpetine pattern which may include a plurality of elongated lamps, such as 100a-100e, each lamp of which has a longitudinal axis parallel to the longitudinal axis of the other major lamp sections. The length of each longitudinal lamp axis may be selected to be generally coextensive with the length dimension of the matrix array of picture elements. The configuration of the lighting array 100 also includes curved end sections, such as 101c-101d. The number of the elongated axial sections of the lamps and the number of the curved end sections of the lamps must be sufficient to bathe the entire width dimension of the matrix array of picture elements 105 with a uniform shower of illumination.

The image splitting/collimating lens 102 is formed as an integral unit. The integrally formed image splitting/collimating lens is, as discussed hereinabove, preferably fabricated of Optical Lighting Film (registered Trademark of 3M SCOTCH) which is subsequently laminated onto a transparent substrate such as glass, a ceramic or plastic. By employing an integrally formed image splitting/collimating lens it is thus possible to achieve two desired optical effects without an increase in the profile of the display. Indeed, since the distance between the two similar images provided by the image splitting effect of the image splitting/collimating lens is controlled by the operative spacing of the lens from the light source (i.e. the more distant the lens 102 from the light source, the farther apart said two images appear) and since it is desired that the distance between the two images be controlled so that said two images are immediately adjacent (i.e. contiguous) one another, it is possible, indeed desirable, to dispose the image splitting/collimating lens in close proximity to the light source 100. As is illustrated in FIG. 5, the image splitting/collimating lens is also preferably used in conjunction with a diffuser 104 to further enhance the uniformity of the light emanating from the light source 100. However, in the instant invention the filter IRF must be between lens 102 and diffuser 104 to achieve the purposes of this invention.

In a second embodiment of the invention illustrated in FIG. 6, the array of light sources 200 is configured as square, helical fluorescent lamp (although it must be appreciated that a plurality of discrete elongated tubular lamps could be employed without departing from the spirit or scope of the instant invention) arranged in a specific pattern or lighting configuration and having each section of lamp disposed in a generally horizontal plane. As stated hereinabove, the array, regardless of configuration, will be arranged to uniformly distribute radiation emanating therefrom over the entire surface area of the matrix of rows and columns of picture elements To this end, the lighting array is shaped in a square, helical pattern which may include at least a pair of squarely configured, elongated lamps, such as 200a-200b, each portion of each squarely configured lamp being parallel to the squarely configured portions of the other lamp. The configuration of the lighting array 200 also includes curved sections, such as 200c-200d. The number of the elongated portions of the lamps is generally equal to eight in the square helical configuration.

The image splitting/collimating lens 202 is formed as an integral unit of two lenses 202a and 202b. The integrally formed image splitting/collimating lens is, as discussed hereinabove, fabricated of two Optical Lighting Films (registered Trademark of 3M SCOTCH) which may be laminated between two transparent substrates or onto a substrate such as glass, a ceramic or plastic.

Turning now to FIGS. 7-8, there is depicted therein a cross-sectional view of a portion of FIG. 5, said cross-sectional view provided to demonstrate the manner in which rays of light "r" emanating from the lamps 100b-100c of the lighting configuration 100 are collimated to present a sharp image to the viewing audience of the liquid crystal display of the instant invention. More particularly, there is depicted in FIG. 7 two lamp segments 101b and 101c, of the embodiment of the lighting configuration wherein the longitudinal axes thereof are disposed in substantially parallel alignment. As can be seen from a perusal of FIG. 7, the rays of light "r" emanating from the three parallel, but spacedly disposed lamps are directed upwardly through the relatively thin image splitting/collimating lens 102. The upper surface, the surface opposite the light source 100, of the image splitting/collimating lens 102 is engineered so as to comprise a series of aligned 45°, multi-faceted prisms 103. The prisms 103 are aligned such that the longitudinal extents thereof are substantially parallel to the longitudinal extents of the substantially parallel lamps 100a and 100b. At both the planar air-to-material interface 102z and the faceted material-to-air interface 102I thereof, the rays of light are collimated and transmitted in collimated fashion FIG. 8 is presented to schematically illustrate how the above-referenced aligned facets of the prisms 103 inherently operate to provide the image splitting effect. This, of course, also illustrates the inherent characteristics of operation of the aforesaid 3M Optical Lighting Film when used in this invention. As illustrated with reference to a segmented arc of lamp 100c having a mid-point B and extremities A and C (these points being designated for convenience of illustration, it being understood that lamp 100c is a circular tube), certain rays of light are reflected backwardly while others are allowed to exit in collimated fashion from lens 102. To the observer located at "eye" this inherently results in a "split image" 1 and 2, the spacing of which, as aforesaid, is governed by the distance between the lamp 100c and the lens 102. In this way, uniformity as well as collimated light is achieved.

The importance of this is illustrated in FIG. 9. As illustrated, by using integral collimating/image splitting lens 102 properly located above the lamps 100c and 100d to create contiguous images, substantial uniformity of illumination is achieved In addition, by sending to the filter IRF collimated light uniformly across its surface not only is virtually all infrared light absorbed (i.e. virtually none transmitted to display panel 10), but color integrity is maintained and by use thereafter of a diffuser 104, the viewing angle problem inherent on sharp cutoff filter IRF is overcome at all reasonable viewing angles (e.g. 0°-30° and preferably 0°-60° normal to the surface of panel 10). Enhanced brightness using reflector 98 and uniformity using diffuser 104 (not shown) may also be achieved if desired.

Once given the above disclosure, many other features, modifications and improvements will become apparent to the skilled artisan. Such other features, modifications and improvements are therefore considered a part of this invention, the scope of which is to be determined by the following claims:

I claim:

1. In a backlit, liquid crystal display which includes a source of light; a matrix array of rows and columns of liquid crystal picture elements spacedly disposed from one side of the light source; and means for collimating light, the collimating means operatively disposed between the light source and the matrix array of rows and columns of liquid crystal picture elements, the liquid crystal display being capable of providing a colored image, including the color red, to a remotely positioned observer, and wherein there is further provided means for creating uniform lighting of said display, the improvement comprising, located between the collimating means and the matrix array of picture elements, an infrared light-absorbing filter capable of preventing substantially all infrared light from being emitted from said display while, at the same time, transmitting substantially all red light therethrough, thereby to maintain the color integrity of the image of the display throughout a viewing angle of from about 0°-30° from normal.

2. The backlit, liquid crystal display according to claim 1 wherein the light collimating means and the means for creating uniform lighting of the display comprises an integral collimating and image splitting means for collimating light from the light source and for refracting light rays emanating from the light source to provide two, similar images thereof, thereby enlarging the area effectively illuminated by the light source, whereby a colored, bright, substantially uniform light distribution is provided in a low profile assembly.

3. The backlit, liquid crystal display according to claim 2 wherein the integral collimating and image splitting means is so located with respect to the source of light so that the split images are contiguous one with the other.

4. The backlit, liquid crystal display according to claim 3 wherein said viewing angle is about 0°-60° from normal.

5. The backlit, liquid crystal display according to claim 4 which further includes a diffuser means located between said infrared filter and the matrix array.

6. The backlit, liquid crystal display according to claim 5 wherein the LCD thickness is less than about 2 inches.

7. The backlit, liquid crystal display according to claim 6 wherein the LCD thickness is about 1 inch.

8. The backlit, liquid crystal display according to claim 5 wherein the display includes, in order from back to front: a reflector plate, a lamp as said light source, said integral collimator and image splitter, said infrared filter, a light diffuser and said matrix array.

9. The backlit, liquid crystal display according to claim 8, wherein the LCD thickness is about 1 inch.

10. The backlit, liquid crystal display according to claim 5 having an RGB-triad color pattern.

11. A backlit, liquid crystal display according to claim 10 which is a full color, substantially uniformly lit, AMLCD having NVIS-B NVG compatibility and which exhibits red color coordinate integrity at viewing angles up to at least about 60° from the normal to the display surface.

12. A backlit, liquid crystal display according to claim 11 which when tested according to MIL-L-85762A Standard for color displays with 0.5 fl intensity generally exhibits throughout the display up to, but not including, the edges an NRb of less than or equal to about 2.2E-09, with slightly higher numbers at the normal angle at the center of the display and somewhat smaller numbers near the edges.

13. A backlit, liquid crystal display according to claim 12 wherein the NVG compatibility includes compatibility with GEN-III NVGs.

* * * * *